United States Patent
Klausner

[15] 3,697,988
[45] Oct. 10, 1972

[54] MUNITION BURST DETECTION SYSTEM AND METHOD

[72] Inventor: Arnold Klausner, Clifton, N.J.

[73] Assignee: The United States of America as represented by the Secretary of the Army

[22] Filed: Jan. 20, 1971

[21] Appl. No.: 107,911

[52] U.S. Cl.................343/5 R, 343/5 DP, 343/5 SA
[51] Int. Cl................................................G01s 9/00
[58] Field of Search..................343/5 R, 5 DP, 5 SA

[56] References Cited

UNITED STATES PATENTS 3,614,719   10/1971   Treacy....................343/5 SA

Primary Examiner—Malcolm F. Hubler
Attorney—Harry M. Saragovitz, Edward J. Kelly and Herbert Berl

[57] ABSTRACT

A munition burst detection system comprising: a Doppler or frequency shift detector; N frequency filters, said detector means comprising the input to said filters; N signal level detectors, said filters each respectively connected individually to one of said detectors; a pulse generating circuit providing (N−X)/2 sampling pulses, where X equals the number of fundamental burst frequency components, and X (N−2), said pulses occurring within the period of said munition burst; a burst detector, said burst detector means initiating the operation of said pulse generating circuit; (N−X)/2 NOR gates, the input to each successive NOR gate comprising the output of respective successive adjacent groups of two level detectors; (N−X)/2 NAND gates, the inputs of each respective NAND gate, except the last of said NAND gates, comprising (1) the outputs of each of said NOR gates, (2) the output of the second lowest frequency level detector, and (3) the sampling pulse corresponding in respective time sequence to the respective NAND gate into which each respective sampling pulse flows; and the input of the last of said NAND gates, constituting the output of the X lowest level detectors and the last occurring sampling pulse from said pulse generating circuit; (N−X)/2 flip-flops each respectively connected individually to one of said NAND gates; and an ACCEPT NAND gate, the inputs of said gate comprising the outputs of said flip-flops, said gate registering positively upon the detection of the proper Doppler frequencies in the munition burst.

9 Claims, 2 Drawing Figures

INVENTOR,
ARNOLD KLAUSNER

MUNITION BURST DETECTION SYSTEM AND METHOD

The invention described herein may be manufactured, used and licensed by the Government for governmental purposes without payment to me of any royalty thereon.

BACKGROUND OF THE INVENTION

The present invention relates to the field of art dealing with electronic time-frequency analysis. More particularly, this invention affords a novel means of attaining a critical analysis of the return signal from the burst of an artillery projectile.

The need for the present invention arose as a solution to the problem of determining projectile warhead acceptability. This problem has been a persistent one throughout the history of ammunition testing. Various attempts have been made to solve it. These attempts have included the placing of observers downrange at a safe distance from the impact site. These downrange observers look for a puff of smoke as an indication of whether a high energy detonation has occurred at the time of impact. Since the possible impact area for projectiles and rockets in the 2.75 inch class and above is quite large, several observers are necessary if the area is to be adequately covered.

Another approach in solving this problem is based on the sound energy that is produced during the blast. By measuring the average decible level of sound energy produced during detonation, one can obtain a rough discrimination between a high and low energy blast.

A third method of solving the problem is based on the light energy that is produced by the blast. By measuring the average lumen level over a given period of time, one can again obtain a rough discrimination between a high and low energy blast.

These three approaches all suffer from serious limitations:

The first method, utilizing visual observations, requires the test personnel to make on-the-spot subjective evaluations of what they see. They must determine whether the puff of smoke they saw was small, medium or large. Inasmuch as such determinations will vary from one observer to another, even where both observe similar blasts, the results are palpably inadequate. In addition, rounds landing too far downrange will not even be seen.

The sound does not solve the problem satisfactorily either. Sound energy produced during detonation will decrease in level approximately inversely as the square of the distance between the source and the point of reception. Since the rockets will land at different distances from the launch site, an average acceptable level of sound energy cannot be established. In addition, if other rounds are fired from adjacent firing ranges, it becomes difficult to discriminate as to where the sound energy is coming from. Furthermore, any other loud sounds generated during the test (such as a jet flying overhead) will compound the difficulty of sound discrimination.

The optical system also suffers from limitations that are somewhat similar to those suffered by the sound system. Since light, like sound, follows an inverse square law, the above-mentioned problems of determining an average acceptable energy level and of discriminating between the blast energy and random energy, also exist in the optical system.

These shortcomings within the prior art gave impetus to the development of the present electronic burst detector. Through this detector the acceptability of a detonation can be ascertained with an ease and accuracy heretofore not believed possible.

Subject invention is based on the fact that the velocity of the fragments produced by a rocket detonation is a direct function of the explosive energy at detonation. By using a Doppler radar, an electrical signal is obtained, the component frequencies of which are a function of the fragmentation velocities. The present invention serves to analyze this signal and produce an output which will indicate acceptablity or non-acceptability of the detonation.

SUMMARY OF THE INVENTION

An object of the present invention is to provide a means of quick and accurate determination of the acceptability of high energy warheads on munitions such as rockets, howitzers, mortars, beehives and grenade launched rounds.

A further object of this invention is to determine the point in time after setback of launch at which impact occurs.

The present invention comprises a Doppler or frequency shift detector means; N frequency filters, said detection means comprising the input to said filters; N signal level detectors, said filters each respectively connected individually to one of said detectors; a pulse generating circuit providing $(N-X)/2$ sampling pulses, where X equals the number of fundamental burst frequency components, and X $(N-2)$, said pulses occuring within the period of said munition burst; a burst detection means, said means initiating the operation of said pulse generating circuit; $(N-X)/2$ NOR gates, the input to each successive NOR gate comprising the output of respective successive adjacent group of two level detectors; $(N-X)/2$ NAND gates, the inputs of each respective NAND gate, except the last of said NAND gates, comprising (1) the outputs of each of said NOR gates, (2) the output of the second lowest frequency level detector, and (3) the sampling pulse corresponding in respective time sequence to the respective NAND gate into which each respective pulse flows; and the input of the last of said NAND gates, constituting the output of the X lowest level detectors and the last occurring sampling pulse from said pulse generating circuit; $(N-X)/2$ flip-flops each respectively connected individually to one of said NAND gates; and an ACCEPT NAND gate, the inputs of said gate comprising the outputs of said flip-flops, said gate registering positively upon the detection of the proper Doppler frequencies in the munition burst.

THE DRAWINGS

DESCRIPTION OF THE PRESENT EMBODIMENTS

The present invention is designed to operate in combination with a Doppler radar unit. This type of radar operates in the following fashion: a signal is transmitted at a constant frequency X which is directed at the target object. As the target object is struck by the transmitted signal, a return signal at a frequency Y will originate. The return frequency Y is a function of the velocity of the target object. The Doppler radar will detect the return frequency Y and will produce a signal (X−Y) which is termed a Doppler signal. This time-frequency signal serves as the input to the present invention.

Figure 1:
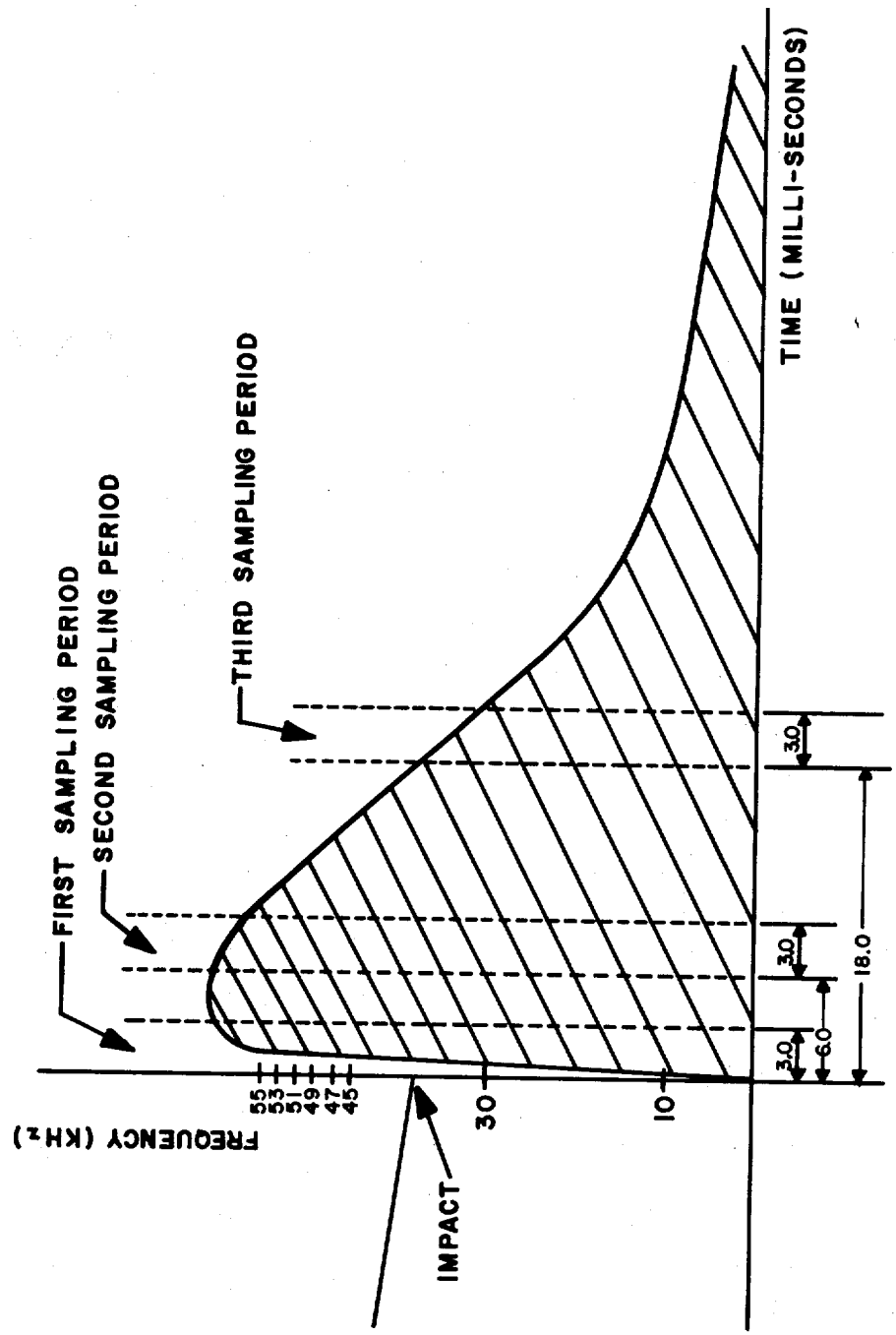
FIG. 1 illustrates in graph form a typical Doppler return signal at impact and during the sampling intervals following impact.

FIG. 1 illustrates a Doppler signal from a typical high explosive fragmentation during the periods shortly prior to and after impact. The illustrated signal was obtained from a 2.75 inch rocket.

Upon firing of the munition transient signals are experienced by the Doppler radar. In order to shield the burst detector from these signals a 1.4 second inhibit signal in triggered at rocket launch. This signal, denoted as a Rocket Fire Pulse in FIG. 2, disables the logic of the system for the mentioned 1.4 second period. This inhibit period acts to protect the logic against any false triggering which might result from the transient signals.

The system will begin receiving the Doppler signal after 1.4 seconds, with impact occurring at about 2.5 seconds after rocket launch. The Doppler signal is first fed into a compression amplifier 12, the function of which is to limit the decibel input to a level which will not force the filters into a non-linear range of operation.

One output of the compression amp 12 is fed into Doppler audio amplifier 14 thus providing the operator with an audio detection means. The other output of the compression amp 12 is fed into a bank of eight filters 16. The frequency values of the filters are chosen on the basis of empirical data. Different frequency values would be more suitable to the analyses of Doppler signals from different munitions.

FIG. 1 illustrates the empirical data that formed the basis for choosing the filters for the 2.75 inch rocket burst detector. The filters chosen were 10 KHz, 30 KHz, 45 KHz, 47 KHz, 51 KHz, 53 KHz and 55 KHz.

Each filter feeds into a respective level detector 18. A detector will register positively only when a signal of sufficient amplitude is received. The detectors are connected to display lights 20 which will light as each respective level detector registers positively. The display lights 20 enable the operator to visually receive and examine a frequency breakdown of the Doppler signal.

A timing system 22 is first activated when and if the 10 KHz detector registers positively. See "Logic Start" indication in FIG. 2. Upon activation the timing system 22 will send out a pulse of a 3 millisecond duration. This pulse, which is fed into NAND gate 24, permits said gate to memorize the input of NOR gate 26 for the 3 millisecond period which is illustrated in FIG. 1 and denoted therein as the First Sampling Period.

The other three inputs to NAND gate 24 are from NOR gates 27 and 28. These NOR gates monitor the six level detectors from 45 KHz through 55 KHz: NOR gate 26 monitors the 53 KHz and 55 KHz detectors. The second gate 27 monitors 49 KHz and 51 KHz, and the third gate 28 monitors 45 KHz and 47 KHz. A positive output from these three NOR gates and from the 30 KHz detector will cause NAND gate 24 to register positively. Flip-flop 29 will record and store this positive output.

At 6 milliseconds after impact the timing system 22 will send out another 3 millisecond pulse. This pulse is fed into NAND gate 30, thus permitting gate 30 to sample the input of the three NOR gates and the 30 KHz detector for the time period illustrated in Fig. 1 as the Second Sampling Period. The output of gate 30 will be stored by flip-flop 32.

At 18 milliseconds after impact the timing system 22 will send out a third 3 millisecond pulse. This pulse flows into NAND gate 34, thereby permitting gate 34 to sample the input of the 10 KHz and 30 KHz detectors for the time period illustrated in Fig. 1 as the Third Sampling Period. The output of gate 34 is stored in flip-flop 36.

At 24 milliseconds the timing system 22 will send out a pulse which (a) inactivates the timing system and (b) places flip-flop 38 in a positive condition.

If the three flip-flops 29, 32 and 36 register positively, Accept NAND gate 40 will also register positively, thereby causing Accept Light 42 to light. The output of Accept NAND Gate 40 is also attached to Non-Accept NAND Gate 44. A negative output from gate 40 will be registered in gate 44 thus causing Non-Accept Light 46 to light.

By watching lights 42 and 46 the operator will be immediately apprised of the munition acceptability, or absence of it, as each rocket is fired.

A random noise generator 48 acts as an input to a self-test made by which the system may be tested when not in actual operation.

Also, the point in time after setback of launch at which impact occurs can be ascertained by monitoring the output of the lowest frequency level detector.

It is to be understood that the present invention can easily be adapted to burst detection of other munitions. Possible adaptation would include changes in (1) the frequencies of the filters, (2) the number of the filters, (3) the sensitivity level of the detector, (4) change in the duration of the sampling periods, e.g., from 1 millisecond through 20 milliseconds, (5) change in the number of sampling periods, e.g., from two through six periods, and (6) change in the time from impact to the end of the last sampling period, e.g., from 15 milliseconds through 150 milliseconds.

Where the number of frequency filters and signal level detectors is each N, the preferred number of NOR and NAND gate, as well as the number of sampling pulses, is (N−X)/2, where X equals the number of fundamental burst frequency components. In the present embodiment, X equals 2 since 10 KHz and 30 KHz are the two frequency components which will appear in all bursts, whether acceptable or not. Such frequency components are termed the fundamental burst frequency components.

Figure 2:
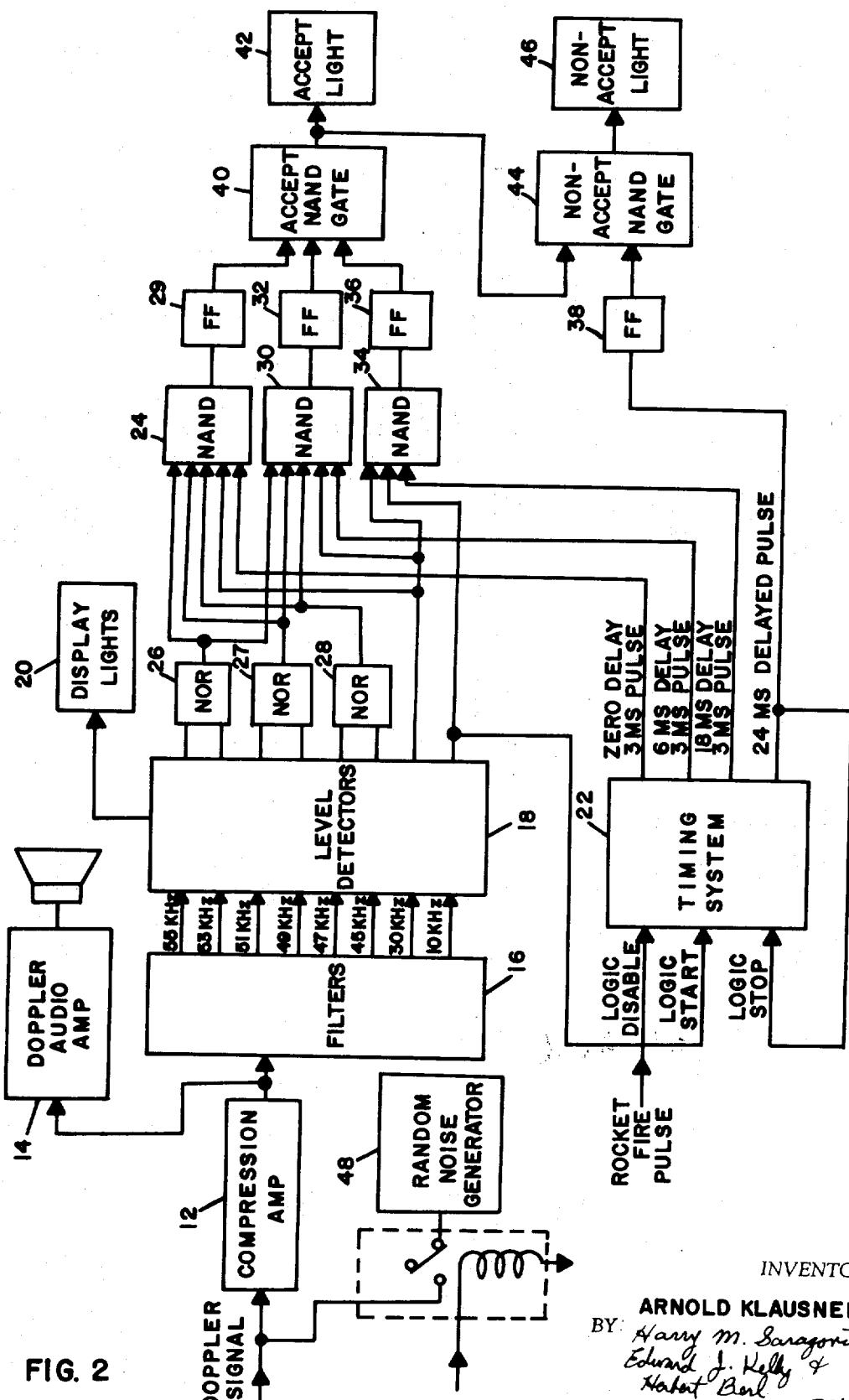
FIG. 2 is a system block diagram of a burst detector made in accordance with the principles of this invention.

Applying the (N−X)/2 formula to the present embodiment, since N equals 8 and X equals 2, the number of NOR gates, NAND gates, and sampling pulses will be 3. FIG. Fig. 2 illustrates this configuration; however, it is to be understood that different configurations utilizing the (N−X)/2 relationship can readily be constructed. Accordingly, it may be seen that the object of providing a means of quick and accurate determination of the munition warhead acceptability has been effectively attained. By proper substitution of filter and logic components the present invention can be used in the detection of bursts of larger rockets, howitzers, mortars, beehives, and grenade launched rounds.

I wish it to be understood that I do wish to be limited to the exact detail of construction shown and described, for obvious modifications will occur to persons skilled in the art.

Having described my invention, what I claim as new and desire to secure by Letters Patent of the United States is:

1. A munition burst detection system for establishing the acceptability of said burst, comprising:
   A. a Doppler or frequency shift detection means;
   B. N frequency filters, said detection means comprising the input to said filters;
   C. N signal level detectors, said filters each respectively connected individually to one of said detectors;
   D. a pulse generating circuit providing (N−X)/2 sampling pulses, where X equals the number of fundamental burst frequency components, and X (N−2), said pulses occuring within the period of said munition burst;
   E. a burst detection means, said means initiating the operation of said pulse generating circuit;
   F. (N−X)/2 NOR gates, the input to each successive NOR gate comprising the output of respective successive adjacent groups of two level detectors;
   G. (N−X)/2 NAND gates,
      a. the inputs of each respective NAND gate, except the last of said NAND gates, comprising
         1. the outputs of each of said NOR gates,
         2. the output of the second lowest frequency level detector, and
         3. the sampling pulse corresponding in respective time sequence to the respective NAND gate into which each respective sampling pulse flows; and
      b. the input of the last of said NAND gates constituting the output of the X lowest level detectors and the last occurring sampling pulse from said pulse generating circuit; and NAND gates registering positively upon the detection of the proper Doppler frequencies;
   H. (N−X)/2 flip-flops each respectively connected individually to one of said NAND gates; and
   I. an ACCEPT NAND gates, the inputs of said gate comprising the outputs of said flip-flops, said gate registering positively upon the detection of the proper Doppler frequencies in the munition burst.

2. A munition burst detective system comprising:
   A. radar means for receiving a Doppler shift signal resulting from a munition burst;
   B. a compression amplifier into which said Doppler signal is fed;
   C. about eight frequency filters, the input of said filters connected to the output of said compression amplifier;
   D. about eight signal level detectors, said filters each respectively connected individually to one of said detectors;
   E. a pulse generating circuit providing about three sampling pulses, said pulses occurring within the period of said munition burst;
   F. a burst detection means, said means initiating the operation of said pulse generating circuit;
   G. about three NOR gates, the input to each successive NOR gate comprising the output of a respective successive adjacent group of two level detectors;
   H. about three NAND gates,
      a. the inputs of each respective NAND gate, except the last of said NAND gates, comprising
         1. the outputs of each of said NOR gates,
         2. the output of the second lowest frequency level detector, and
         3. the sampling pulse corresponding in respective time sequence to the respective NAND gate into which each respective sampling pulse flows; and
      b. the input of the last of said NAND gates constituting the output of the two lowest level detectors and the last occurring sampling pulse from said pulse generating circuit;
   I. about three flip-flops each respectively connected individually to one of said NAND gates; and
   J. an ACCEPT NAND gate, the inputs of said gate comprising the outputs of said flip-flops, said gate registering positively upon the detection of the proper Doppler frequencies in the munition burst.

3. The combination defined in claim 2 further including an ACCEPT light the input of which comprises the output of said ACCEPT NAND gate, said light affording a real-time visual indication of munition acceptability.

4. The combination defined in claim 2 further including a Doppler audio amplifier connected to the output of said compression amplifier, thus affording an audio monitor of the munition detonation.

5. The combination defined in claim 2 further including a munition impact detection means, said means comprising the output of the lowest of said signal level detectors.

6. The combination defined in claim 2 further including a display light connected to the output of each of said signal level detectors, said lights affording a real-time visual frequency analysis of the munition detonation.

7. The combination defined in claim 2 further including a Non-Accept NAND gate, and Non-Accept Light connected to the output of said Accept NAND gate so as to provide a visual indication of munition detonations which are unacceptable.

8. The combination defined in claim 7 wherein said Accept NAND gate has, for purposes of recording, a positive voltage level output and said Non-Accept NAND gate has, for purposes of recording, a negative voltage level output.

9. The method of munition burst detection comprising
   A. receiving a Doppler return signal from the exploding munition;
   B. selectively frequency filtering of said signal by N filters;
   C. detecting the amplitude levels of the output of said filters;
   D. feeding the output of respective successive adjacent groups of two level detectors into (N−X)/2 NOR gates, where X is the number of fundamental burst frequency component and X (N−2);
   E. feeding the output of said NOR gates into a like number of NAND gates;

F. sequentially activating said NAND gates for discrete durations with sampling pulses produced by a pulse generating circuit, said pulses occurring within the period of the munition burst;

G. storing the output of each of said NAND gates in flip-flops; and

H. electronically registering the existence or absence of the proper combination of NAND gate outputs.

* * * * *